US006188400B1

(12) United States Patent
House et al.

(10) Patent No.: US 6,188,400 B1
(45) Date of Patent: *Feb. 13, 2001

(54) REMOTE SCRIPTING OF LOCAL OBJECTS

(75) Inventors: Daniel Edward House, San Jose; Constance Jane Nelin, Monte Sereno; Rebecca B. Nin, Morgan Hill, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/828,480

(22) Filed: Mar. 31, 1997

(51) Int. Cl.$^7$ .................................................. G06F 3/00

(52) U.S. Cl. ..................... 345/335; 345/329; 707/501; 709/313; 709/328

(58) Field of Search .......................... 707/501; 345/335, 345/333, 329; 395/683, 682, 684

(56) References Cited

U.S. PATENT DOCUMENTS

| | | |
|---|---|---|
| 5,168,441 | 12/1992 | Onarheim et al. . |
| 5,179,698 | 1/1993 | Bachman et al. . |
| 5,193,182 | 3/1993 | Bachman et al. . |
| 5,193,183 | 3/1993 | Bachman . |
| 5,195,178 | 3/1993 | Krieger et al. . |
| 5,241,645 | 8/1993 | Cimral et al. . |
| 5,249,300 | 9/1993 | Bachman et al. . |
| 5,729,594 * | 3/1998 | Klingman et al. ................. 379/93.12 |
| 5,742,768 * | 4/1998 | Gennaro et al. ...................... 395/200 |
| 5,805,829 * | 9/1998 | Cohen et al. .................... 395/200.32 |
| 5,953,005 * | 9/1999 | Liu ....................................... 709/203 |

OTHER PUBLICATIONS

NetScape 2.0 The most completed references, QUE, Mark R. Brown, Chapter 31, pp. 787–814, 1995.*
The Java Language Environment, A White Paper, James Gosling, Sun Microsystem, May 1995.*
Interaction Between Java and Lonwork, ICT Viena Univesity Tech., Jan. 1997.*
Netscape 2.0 The most complete Reference, QUE, Mark R. Brown, pp. 790, 935, 942–962, 1995.*
White Pager The Java language environment, SUN Microsystems, Gosling/McGilton, pp. 32–33, 1995.*
HTML "for Fun and Profit", Morris, SunSoft Press, 1995.*
Interaction between Java and LonWorks, Austrian Science Foundation, Reiter and Kral, pp. 335–340, Jan. 1997.*
Remote Access Tool for Earth Science Data. Dobinson and Raskin, Jet propulsion Laboratory, pp. 119–120, Feb. 1997.*
An emmbedded Visual Programming Interface for Intelligent Information retrieval on the Web, Lee and Chen, Nationa Sun Yat–Sen University, Feb. 1997.*

* cited by examiner

Primary Examiner—Raymond J. Bayerl
Assistant Examiner—Thomas T. Nguyen
(74) Attorney, Agent, or Firm—Pretty & Schroeder, P.C.

(57) ABSTRACT

A method, apparatus, and article of manufacture for remotely scripting local objects. An applet is executed in a browser in a remote client computer, thereby generating control information. The control information is transmitted from the client computer to a network server. A script stored on the network server is executed using the control information. The execution of the script generates script output data. The script output data is transmitted from the network server to the browser. The output data can be thereafter used to execute another applet in the client browser. The output data need not comprise an entire HTML page, but may comprise only a portion of the page as required to display the required information.

18 Claims, 4 Drawing Sheets

REMOTE SCRIPTING OF LOCAL OBJECTS

CROSS-REFERENCE TO RELATED APPLICATIONS

This application is related to the following co-pending and commonly-assigned patent applications:

application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed on same date herewith, by Daniel E. House, Brian J. Owings, and Shiau—Shiau Pei;

application Ser. No. 08/828,476, entitled "SHARED OBJECT MODEL," filed on same date herewith, by Brian J. Owings, Shiau—Shiau Pei, and Daniel E. House;

application Ser. No. 08/828,989, entitled "METHOD AND APPARATUS FOR SIMULATING A MULTI-TIERED COMPUTER ENVIRONMENT," filed on same date herewith, by Daniel E. House and Constance J. Nelin;

application Ser. No. 08/828,478, entitled "MULTI-TIER VIEW PROJECT WINDOW," filed on same date herewith, by Howard J. Glaser, Daniel E. House, and Constance J. Nelin;

application Ser. No. 08/829,104, entitled "EXTENDER USER INTERFACE," filed on same date herewith, by Thomas E. Conrad, Howard J. Glaser, Jean C. Ho, James L. Keesey, Constance J. Nelin, and Gerold J. Wilmot;

application Ser. No. 08/828,846, entitled "SHARED MODULES GRAPHICAL USER INTERFACE," filed on same date herewith, by Howard J. Glaser, Daniel E. House, and Constance J. Nelin;

application Ser. No. 08/828,479, entitled "QUERY SELECTION FOR A PROGRAM DEVELOPMENT ENVIRONMENT," filed on same date herewith, by Howard J. Glaser and Mary C. Lehner;

application Ser. No. 08/828,477, entitled "DOCKING AND FLOATING MENU/TOOL BAR," filed on same date herewith, by Howard J. Glaser, Stewart E. Nickolas, and Karl D. Johnson;

application Ser. No. 08/828,890, entitled "HTML INTEGRATION UTILITY FOR A PROGRAM DEVELOPMENT ENVIRONMENT," filed on same date herewith, by Howard J. Glaser;

application Ser. No. 08/828,897, entitled "EXTENDER SMART GUIDE," filed on same date herewith, by Howard J. Glaser;

application Ser. No. 08/828,481, entitled "MULTI-TIER DEBUGGING," filed on same date herewith, by Daniel E. House and Constance J. Nelin; and application Ser. No. 08/828,990, entitled "DYNAMIC DISCOVERY OF CONTROLS," filed on same date herewith, by Daniel E. House and Constance J. Nelin;

all of which applications are incorporated by reference herein.

BACKGROUND OF THE INVENTION

1. Field of the Invention

This invention relates in general to programming development environments performed by computers, and in particular, to a method and apparatus for remotely scripting local objects in a network server.

2. Description of Related Art

With the fast growing popularity of the Internet and Intranets, especially Web-based networks, there is also a fast growing demand for Internet and Intranet access to databases. Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

The Internet has considerable potential to provide access to powerful and complex applications implemented at the Web server to a broad scope of remote clients. This implementation has important benefits such as reducing computer memory and processing requirements at the remote client, and increasing the security of the application by retaining selected portions of the application in a secure location in the Web server. However, such implemetations can be communication intensive, and communication bandwidth and latency is already a problem, even for simple Internet applications. What is needed is a method of implementing Internet applications that provides the application developer the flexibility to allocate functional capability between the remote client and the Web server so as to meet the security, remote client processing and communication link requirements for the particular application. The present invention satisfies that need.

SUMMARY OF THE INVENTION

To overcome the limitations in the prior art described above, and to overcome other limitations that will become apparent upon reading and understanding the present specification, the present invention discloses a method, apparatus, and article of manufacture for remotely scripting local objects.

The method comprises the steps of executing an applet in a browser in a remote client computer, thereby generating control information, transmitting the control information to the Web server to initiate execution of a script in the Web server and generate output data therefrom, and transmitting the script output from the network server to the browser. This output data can be thereafter used to execute another applet in the client browser. The output data need not comprise an entire HTML page, but may comprise only a portion of the page as required to display the required information.

The invention also comprises an apparatus for remotely scripting local objects. The apparatus includes a client computer for executing an applet in a browser to generate control information and a network server communicatively coupled to the client computer. The network server comprises a means for executing a script therein in accordance with the control information to generate script output data and a means for transmitting the script output data to the client computer.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
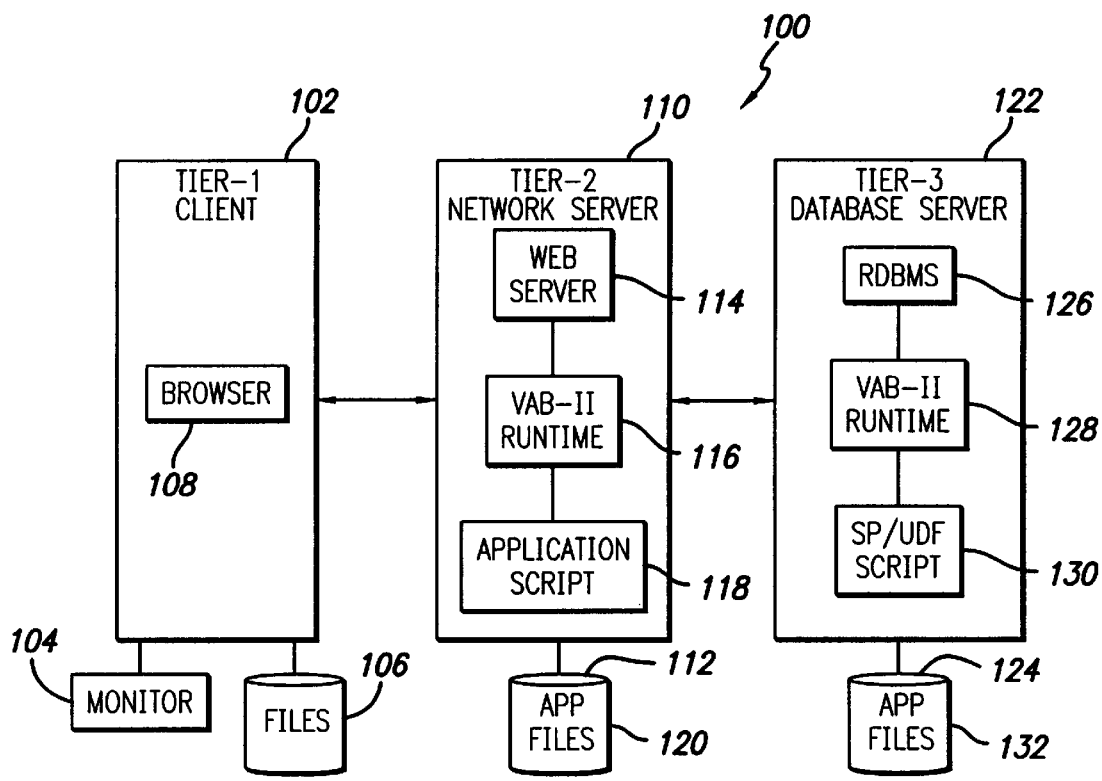
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and, optionally, one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol), sockets, or other communications mechanisms.

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier via HTTP, APIs, sockets, or other communications mechanisms. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

The third tier comprises a database server 122 having one or more data storage devices 124 connected thereto. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from an APP file 132 stored on a data storage device 124. The RDBMS 126 (such as IBM's DB2 product) receives requests either directly from tier-2 and/or indirectly from tier-2 via the VAB-I runtime module 128, and then performs the desired database functions. The VAB-II runtime module 128 executes the SP/UDF scripts 130. The SP/UDF scripts 130 comprise programming logic for accessing the database via the RDBMS 126 and communicating with the tier-2 computer programs.

Figure 2:
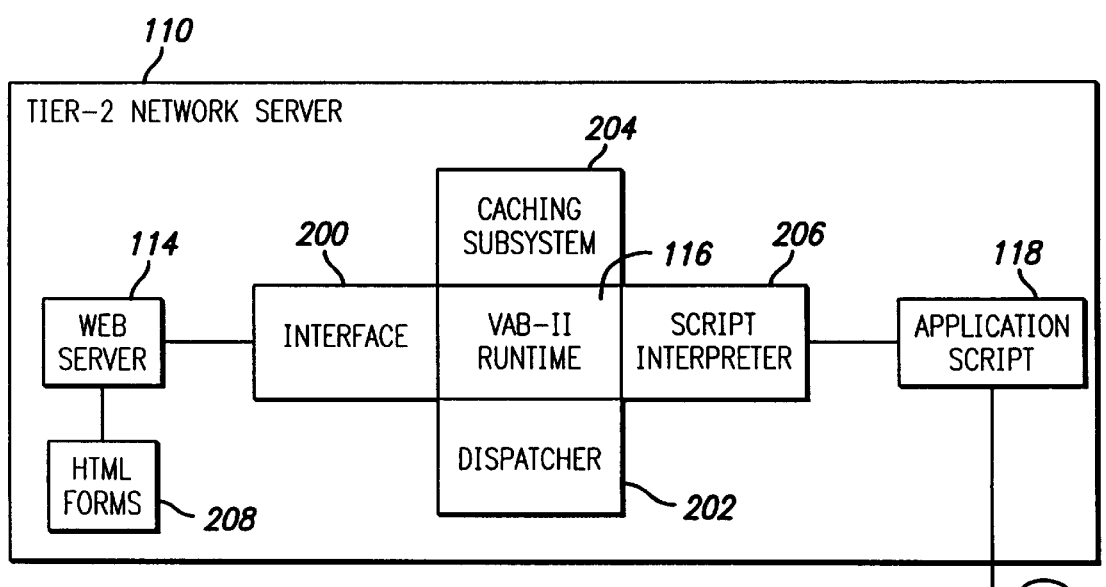
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
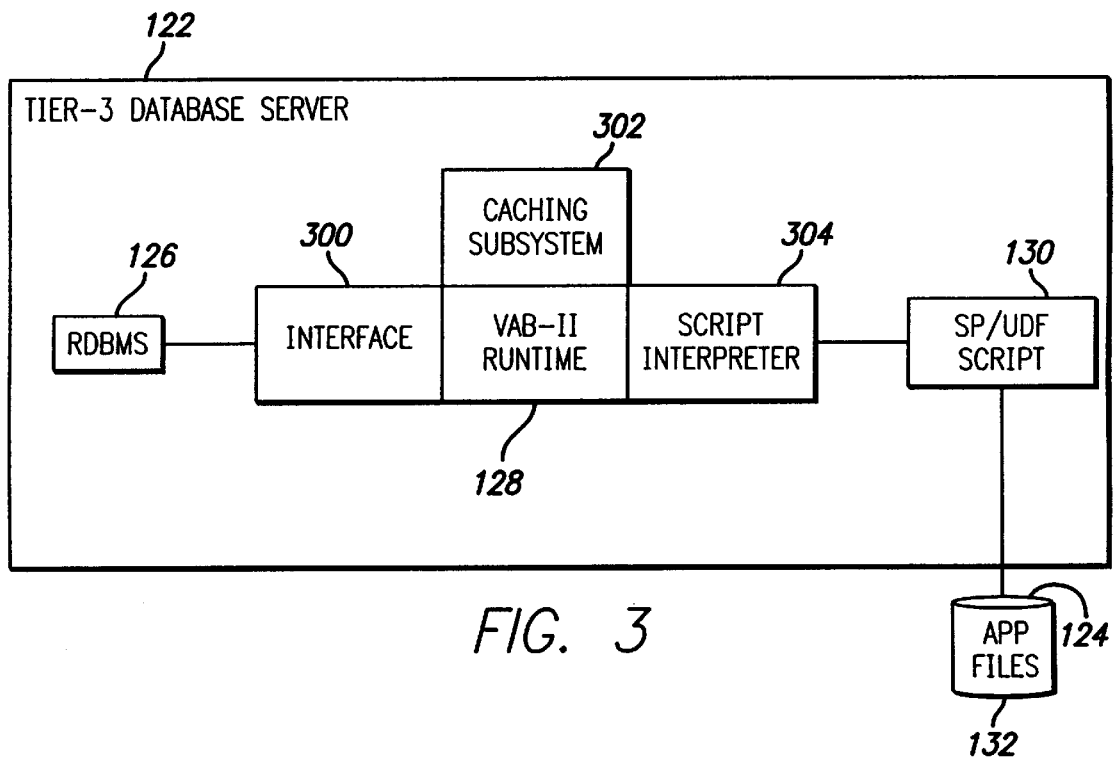
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 retrieved from one or more APP files 132 store on the data storage device 124. No dispatcher is required for the VAB-II runtime module 128 in the database server 122. The interface 300 provides a mechanism for invoking the VAB-II runtime module 128 from the database server 126 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform 134 or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
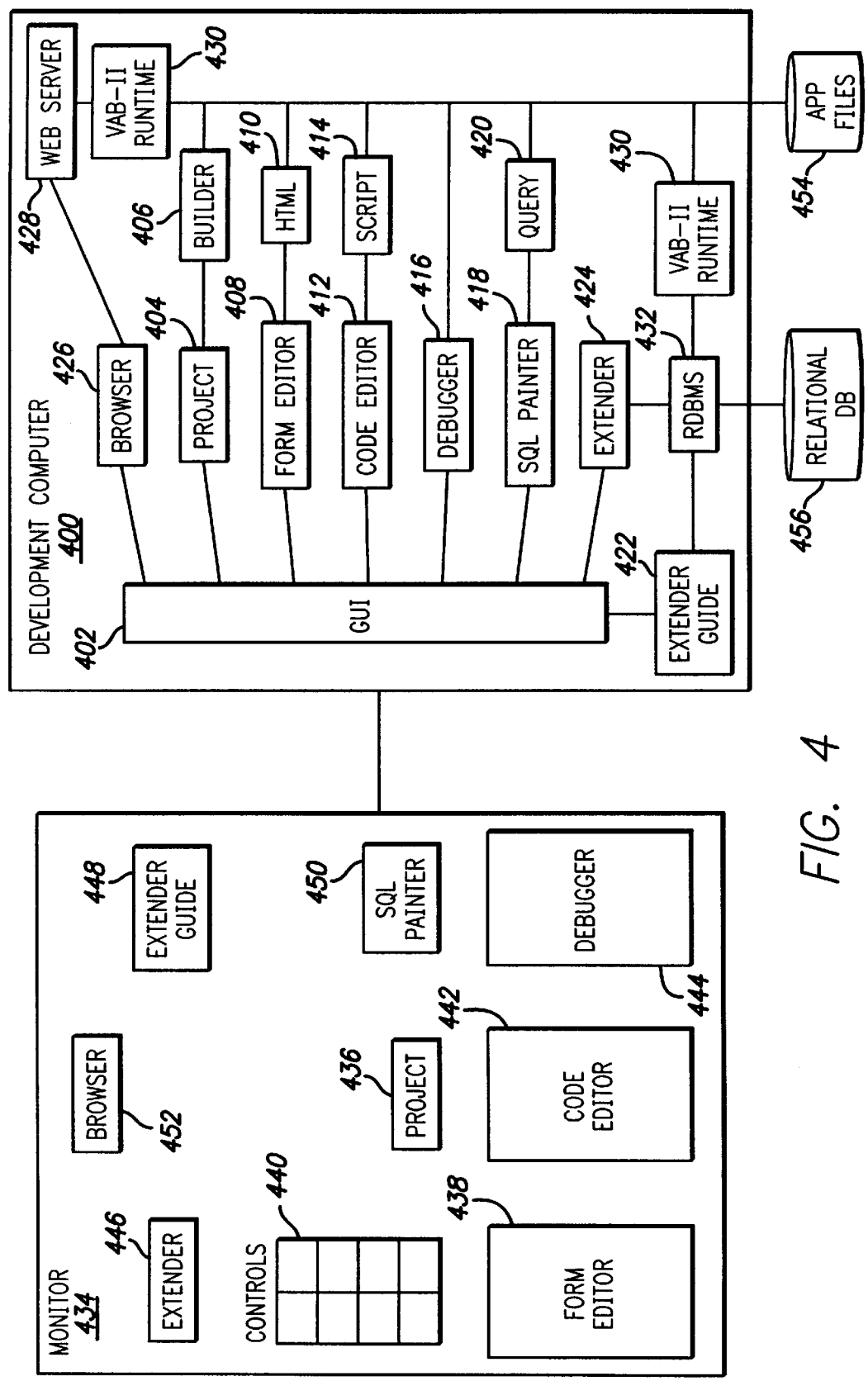
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS 432. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Controls

Figure 5B:
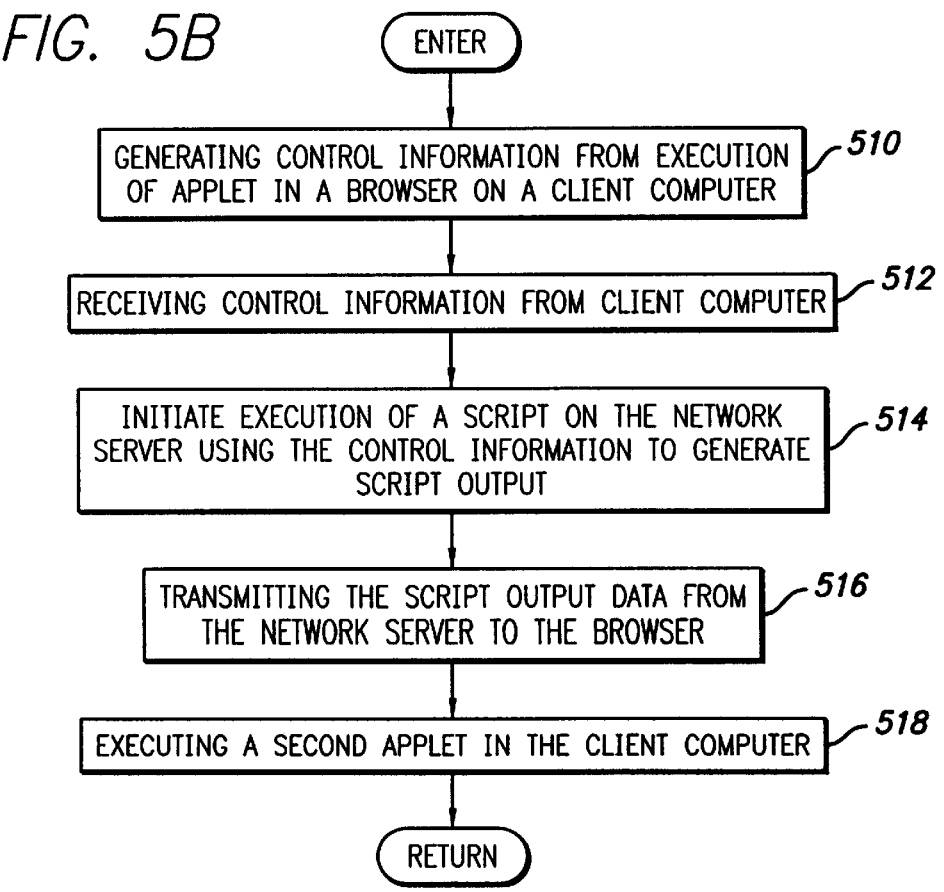
FIGS. 5A and 5B illustrate the use of controls and the remote scripting aspects of the present invention and the method steps used in connection with remote scripting.
Figure 5A:
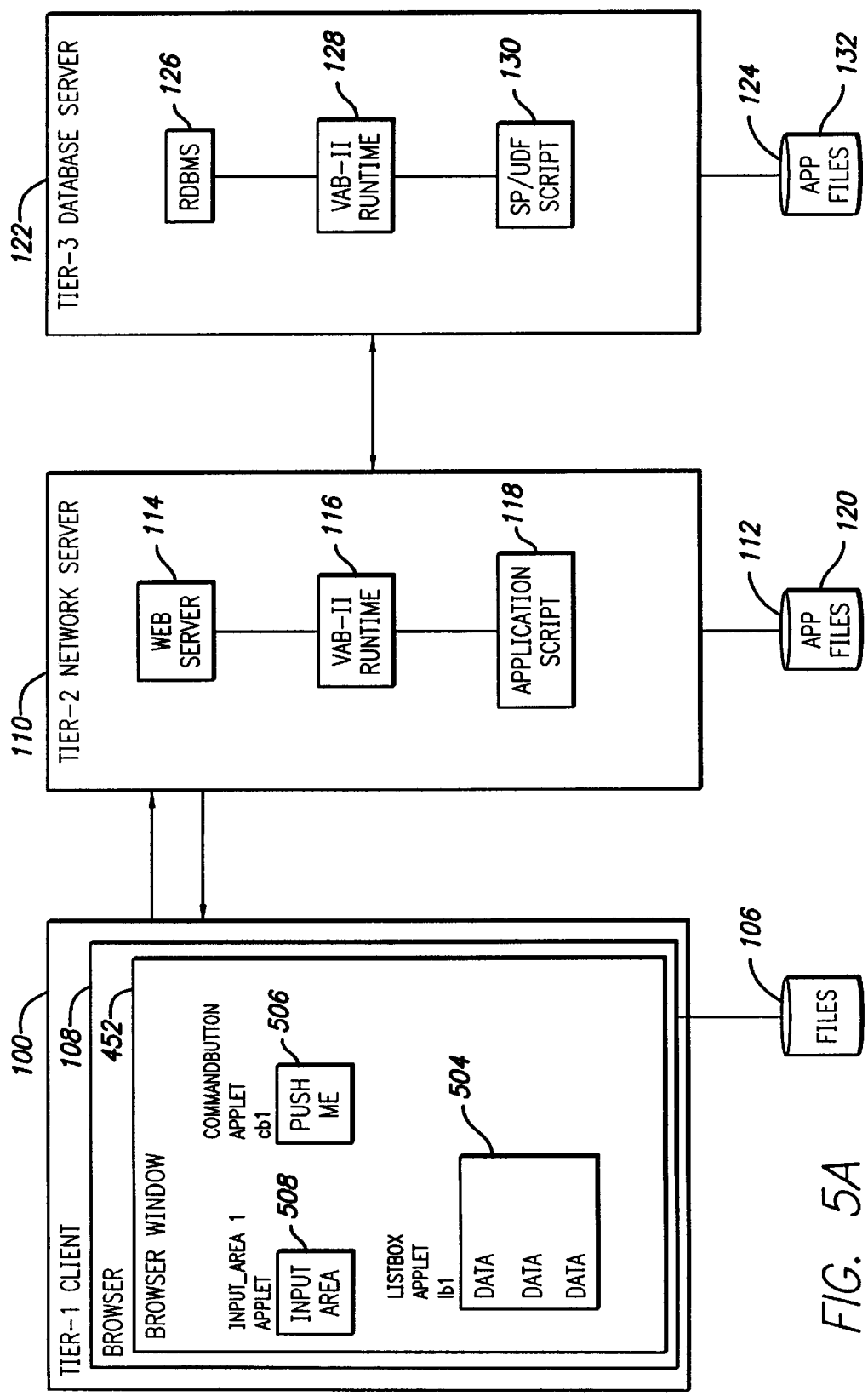

FIGS. 5A and 5B illustrate the use of the controls and the remote scripting aspects of the present invention. There are two types of controls: nonvisual controls and visual controls. Further, there are two categories of visual controls: Java applet controls and static controls. Table 1 provides a partial list of Java applet controls; Table 2 provides a partial list of static controls; and Table 3 provides a partial list of nonvisual controls. "Nonvisual controls" have no visual representation on the client 102. An example of nonvisual controls is a "timer" used by the developer to cause time-based events. There may be a nonvisual control that represents a form or an entire application. The purpose of these two examples would be to maintain properties and states of forms and applications.

"Visual controls" are those that have a visual representation on the client. The visual controls fall into two categories: Java applet controls and static controls. Java applet controls support invocation of scripts stored on the network server 110 and have properties that can be changed at runtime. Static controls are represented by HTML tags on the generated form, and no scripting or setting of properties at runtime is supported.

All visual controls that are scriptable are implemented as Java applets that communicate to the network server via HTTP. Nonvisual controls may or may not be implemented as Java applets, depending on whether or not they need to be present and running in the browser 102 (if they do, they are applets; otherwise, they are not).

For example, a nonvisual control representing a "timer" might be implemented as an applet, run in the browser 108, and communicate with the network server 110 when the timer "pops". In another example, the timer might be implemented as a script and run in the network server 110, in which case it is not an applet. In alternative embodiments, other containers (non-browsers) and other communication mechanisms (such as sockets) will be supported.

A Java applet is created for each scriptable control provided by the present invention. These applets may be customized by the developer. Since there is one applet per control, if there are five command buttons (for example) on one form, only one copy of the command button applet is downloaded to the client browser 108. This applet remains in the browser cache.

In the preferred embodiment, applet controls communicate back to the tier-2 VAB-II runtime module through the web server 114. This communication allows the present invention to remotely script local objects. Nominally, this is performed via HTTP, but in alternative embodiments, other mechanisms can be considered, such as socket level communication or other communication protocols.

A unique feature of the present invention is the capability to allow creation of local applets on the client which cause execution of scripting on remote machines with two-way communications between the local applet and the remote script. This technique has several advantages over prior art methods. For example, two-way communication and remote scripting allows the scripts to be stored and managed solely at the network server, resulting in greater code security and integrity. This feature also allows reduced data communications between the client and the network server, since operations may be intelligently shared between the two to minimize data transfer. Finally, since the client browser can cause execution of potentially lengthy scripts in the network server, this feature minimizes client processing and memory requirements.

This feature is further described with respect to FIG. 5A, which illustrates the flow of control information between applets in the client browser and the network server. In the present invention, when a user causes an event to be triggered on an applet, control information flows from the applet in the browser to the network server. FIG. 5A illustrates a form (FORM1), an applet called COMMAND_BUTTON1 506 on FORM1, and an applet called INPUT_AREA1 508 on FORM1, which are contained in an application APP1.

When FORM1 is displayed by the browser 108 and when a command button applet is "pressed", the associated Java applet invokes a universal resource locator (URL) to communicate with the running instance of the application on the network server 110.

The information that must flow from the Java applet to the network server 110 includes:

An identification of the application instance (or null). This can be either via authentication, where an authenticated user identifies uniquely the application instance, or a "hidden variable" containing an application instance identifier (this is insecure), or another means. If this is null, there is not yet an application instance created, which means that this is a "first call" and it will cause the application instance to be created.

The application name, e.g., APP1.

The name of the control causing the event, e.g., COMMAND_BUTTON1 506.

The event, e.g., ButtonClick.

The form on which the event occurred, e.g., FORM1.

Other state data, such as the current value of INPUT_AREA1 508 if it is changed. The developer may not have created an OnChanged event for INPUT_AREA1 508. In this case, when COMMAND_BUTTON1 506 is pressed, the current state of INPUT_AREA1 508 may not be accurate on the network server 110. Therefore, applets containing new state information are synchronized with the server whenever an event causes a flow from the client browser 108 to the network server 110 (this is why timer in the previous example is an applet in the client browser 108 and not just a network server object). This is analogous to HTML forms processing, where changes are "batched" before communicating with the network server for efficiency.

When the interface from the applet to the network server 110 is HTTP, a sample URL for the above might look like:

"http: // www.someco.com / cgi-bin / OurProduct ? app = APP1 + appinstance = ab12cdef + form = FORM1 + control = COMMAND_BUTTON1 + event = ButtonClick + other1 = INPUT_AREA1 (user input from input_area1) + other2 = . . . "

The ButtonClick event is associated with a script on the network server 110. In this example, the script includes programming that accesses the database server through VAB-II Runtime 116 and returns data into a listbox 504 in FORM1. The data returned (script output data) from the database and network servers to the command button comprise a data string.

This data string might, for example, be "ADD DATA1 DATA2 DATA3 TO LB1". In this very simple example, this is a command string that the listbox 504 understands, and that the command button 506 now has in its possession. As illustrated, the data string comprises only a portion of an HTML page, relieving the need to transmit an entire HTML page merely to update a portion of a page. The data string may also comprise an entire HTML page. Alternatively, the data string may also comprise information used to execute a second applet in the client browser 108.

Getting the command string from the command button 506 to the listbox 504 is an example of applet-to-applet communication. It is facilitated by the fact that the command button 506 can retrieve a reference to LB1 504 from the list of name-reference pairs being kept in static data (command button 506 and listbox 504 are derived from the common base applet keeping this data). The command button 506 uses the reference to LB1 504 to invoke the listbox's "execute" method (which must be public), giving it the command string to update its contents.

FIG. 5B is a flow chart illustrating the method steps employed in implementing the foregoing. First, control information is generated by an applet in the browser 108. This is illustrated in block 510. That control information is transmitted from the client 102 to the network server 110 and received 512 therein. Next, using this control information, a script is executed on the network server 110. This is represented by block 514. Execution can be initiated either by the receipt of the control information, or by other means. Next, as shown in block 516, the resulting script output data is then transmitted from the network server to the browser 108, where if desired, the data can be diplayed on the browser 108 or used to execute 518 an applet in the browser 108.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for remotely scripting local objects. The method comprises the steps of executing an applet in a browser in a remote client computer, thereby generating control information, transmitting the control information to the Web server to initiate execution of a script in the Web server and generate output data therefrom, and transmitting the script output from the network server to the browser. This output data can be thereafter used to execute another applet in the client browser. The output data need not comprise an entire HTML page, but may comprise only a portion of the page as required to display the required information.

The invention also comprises an apparatus for remotely scripting local objects. The apparatus includes a client computer for executing an applet in a browser to generate control information and a network server communicatively coupled to the client computer. The network server comprises a means for executing a script therein in accordance with the control information to generate script output data and a means for transmitting the script output data to the client computer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| JAVA Applet Controls | |
|---|---|
| Control | Description |
| Label | This control displays a line of text. As an applet control, the text could be changed to show status, or the results of a request. The control does not respond to any events. |
| Button | This control is a push-button. One Button may have its default property set to true, in which case pressing the Enter key on other applets on the page causes |

TABLE 1-continued

JAVA Applet Controls

| Control | Description |
| --- | --- |
| | the button's click event to be triggered. |
| Listbox | Displays a list of selectable items. An event can be triggered when an item is selected. |

TABLE 2

Static controls

| Control | Description |
| --- | --- |
| Heading | This generates a <H1>, <H2>, or <H3> HTML tag depending on its properties. |
| Text | This generates a <P> HTML tag. |
| List | This generates a <UL> or <OL> HTML tag. depending on its properties. List items are typed directly in the list area. |
| Image | This generates a <IMG> HTML tag. |
| Hypertext Link | This generates a <A> HTML tag. |

TABLE 3

Nonvisual controls

| Control | Description |
| --- | --- |
| Timer | To trigger a periodic event. |
| Data | To control data bound controls. |

What is claimed is:

1. A method of remotely scripting local objects, comprising the steps of:

producing control information derived from execution of a first applet in a browser on a client computer, wherein the first applet is created on the client computer at a first tier, and wherein the first applet is available locally at the client computer without being downloaded from a network server at a second tier;

synchronizing the first applet with the network server when the first applet contains new state data;

transmitting control information produced by the first applet from the client computer at the first tier to a network server at the second tier, remotely initiating execution of a script on the network server at the second tier using a script interpreter and the control information, wherein the execution of the script generates script output data, wherein the script is solely stored and managed on the network server at the second tier, wherein the script includes programming that communicates with the browser and that accesses a database server at a third tier, and wherein script output data comprises database data retrieved from the database server at the third tier;

transmitting the script output data from the network server at the second tier to the browser at the first tier; and in response to receiving the script output data at the browser at the first tier, executing a second applet in the browser on the client computer, wherein the second applet is available locally at the client computer without being downloaded from the network server at the second tier.

2. The method of claim 1, wherein the receipt of the control information from the client computer immediately initiates execution of the script in the network server.

3. The method of claim 1, wherein the script output data is returned to the first applet.

4. The method of claim 1, wherein the script output data comprises information for executing the second applet in the client computer.

5. The method of claim 1, wherein the control information is generated by invoking a resource locator in the first applet.

6. The method of claim 1, wherein the first applet is executed in the client computer in response to an event initiated by a browser control on a form, and the control information comprises:

a script identifier;

data identifying the form on which the event occurred;

data identifying the browser control causing the event; and data identifying the event.

7. An apparatus for remotely scripting local objects, comprising:

a client computer at a first tier for producing control information derived from execution of a first applet in a browser on a client computer, wherein the first applet is created on the client computer at a first tier, and wherein the first applet is available locally at the client computer without being downloaded from a network server at a second tier;

at the client computer, means for synchronizing the first applet with the network server when the first applet contains new state data;

at the client computer, means for transmitting control information produced by the first applet from the client computer at the first tier to a network server at the second tier;

a network server at the second tier, comprising means for remotely executing a script, stored on the network server at the second tier, therein using a script interpreter in accordance with the control information to generate script output data, wherein the script includes programming that communicates with the browser and that accesses a database server at a third tier, and wherein script output data comprises database data retrieved from the database server at the third tier, and means for transmitting the script output data to the client computer, and at the client computer at the first tier, means for, in response to receiving the script output data at the browser, executing the second applet in the browser, wherein the second applet is available locally at the client computer without being downloaded from the network server at the second tier.

8. The apparatus of claim 7, wherein the network server further comprises means for initiating execution of the script in response to receipt of the control information in the network server.

9. The apparatus of claim 7, wherein the script output data comprises only a portion of an HTML page.

10. The apparatus of claim 7, wherein the script output information comprises information for executing the second applet in the client computer.

11. The apparatus of claim 7, wherein the first applet in the client computer further comprises a means for invoking a resource locator.

12. The apparatus of claim 7, wherein the first applet is executed in the client computer in response to an event initiated by a browser control on a form and wherein the control information comprises a script identifier, data identifying the form on which the event occurred, data identifying the browser control causing the event, and data identifying the event.

13. A program storage device, readable by computer, having a processor, a memory and a data storage device, tangibly embodying one or more programs of instructions executable by the computer to perform method steps of remotely scripting local objects, the method comprising the steps of:

producing control information derived from execution of a first applet in a browser on a client computer, wherein the first applet is created on the client computer at a first tier, and wherein the first applet is available locally at the client computer without being downloaded from a network server at a second tier;

synchronizing the first applet with the network server when the first applet contains new state data;

transmitting control information produced by the first applet from the client computer at the first tier to a network server at the second tier;

remotely initiating execution of a script on the network server at the second tier using a script interpreter and the control information, wherein the execution of the script generates script output data, wherein the script is solely stored and managed on the network server at the second tier, wherein the script includes programming that communicates with the browser and that accesses a database server at a third tier, and wherein script output data comprises database data retrieved from the database server at the third tier;

transmitting the script output data from the network server at the second tier to the browser at the first tier; and in response to receiving the script output data at the browser, executing the second applet in the browser on the client computer, wherein the second applet is available locally at the client computer without being downloaded from the network server.

14. The program storage device of claim 13, wherein the receipt of the control information from the client computer immediately initiates execution of the script in the network server.

15. The program storage device of claim 13, wherein the script output data comprises only a portion of an HTML page.

16. The program storage device of claim 13, wherein the control information is generated by invoking a resource locator in the first applet.

17. The program storage device of claim 13, wherein the first applet is executed in the client computer in response to an event initiated by a browser control on a form, and the control information comprises a script identifier, data identifying the form on which the event occurred, data identifying the browser control causing the event, and data identifying the event.

18. The program storage device of claim 13, wherein the script output data comprises information for executing the second applet in the client computer.

* * * * *

UNITED STATES PATENT AND TRADEMARK OFFICE
CERTIFICATE OF CORRECTION

PATENT NO. : 6,188,400 B1 Page 1 of 1
DATED : February 13, 2001
INVENTOR(S) : Daniel Edward House, Constance Jane Nelin, and Rebecca B. Nin It is certified that error appears in the above-identified patent and that said Letters Patent is hereby corrected as shown below:

<u>Column 6,</u>
Line 1, before "Visual" please insert
-- "Nonvisual controls" have no visual representation on the client 102. An example of nonvisual controls is a "timer" used by the developer to cause time-based events. There may be a nonvisual control that represents a form or an entire application. The purpose of these two examples would be to maintain properties and states of forms and applications. --

<u>Column 10,</u>
Line 63, after "for" please insert -- immediately --

Signed and Sealed this

Second Day of October, 2001

Attest:

NICHOLAS P. GODICI
Attesting Officer   Acting Director of the United States Patent and Trademark Office